(No Model.) 2 Sheets—Sheet 1.
R. J. SHEEHY.
MOTOR APPARATUS FOR VEHICLES.
No. 458,274. Patented Aug. 25, 1891.
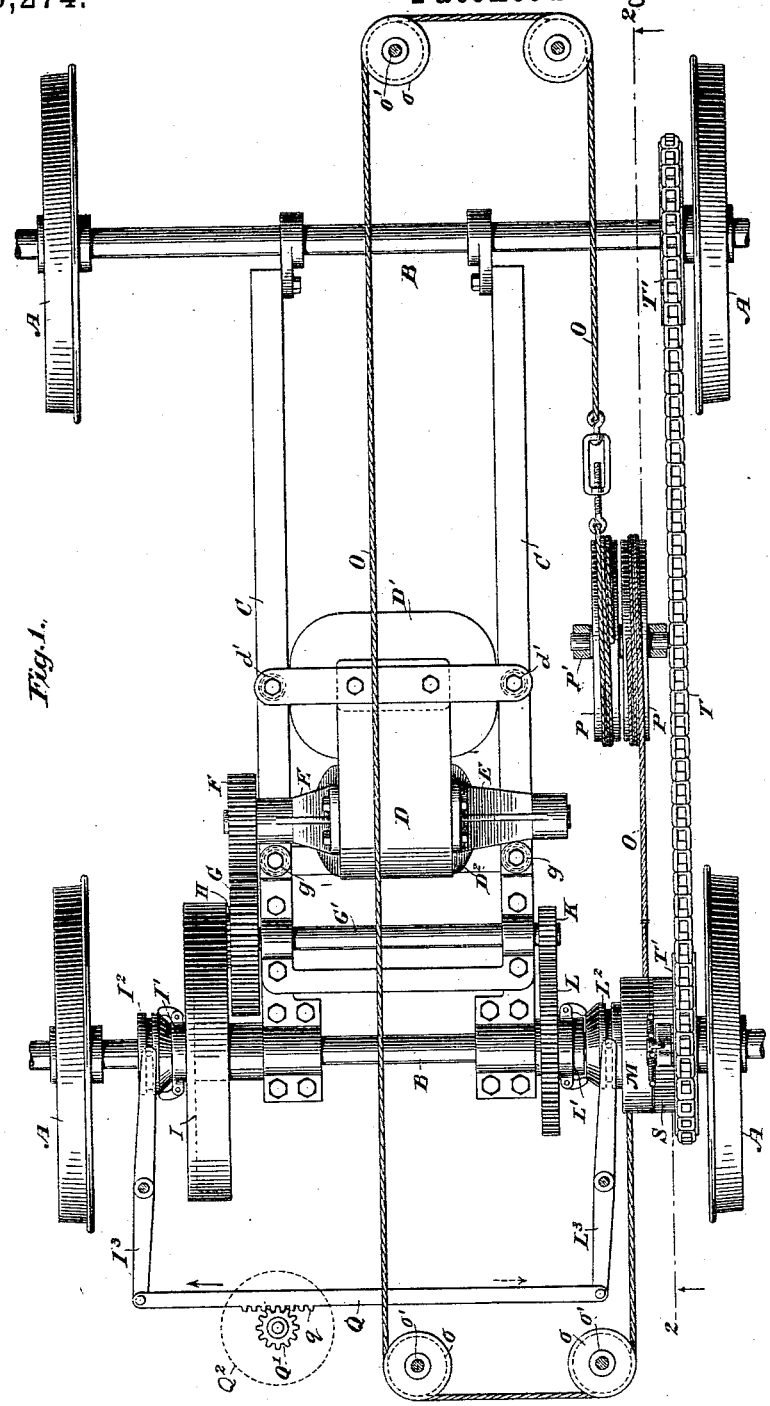
Witnesses
Geo. W. Breck.
Henry W. Lloyd.
Inventor
Robert J. Sheehy
By his Attorneys
Baldwin, Davidson & Wight (No Model.) 2 Sheets—Sheet 2.
R. J. SHEEHY.
MOTOR APPARATUS FOR VEHICLES.
No. 458,274. Patented Aug. 25, 1891.
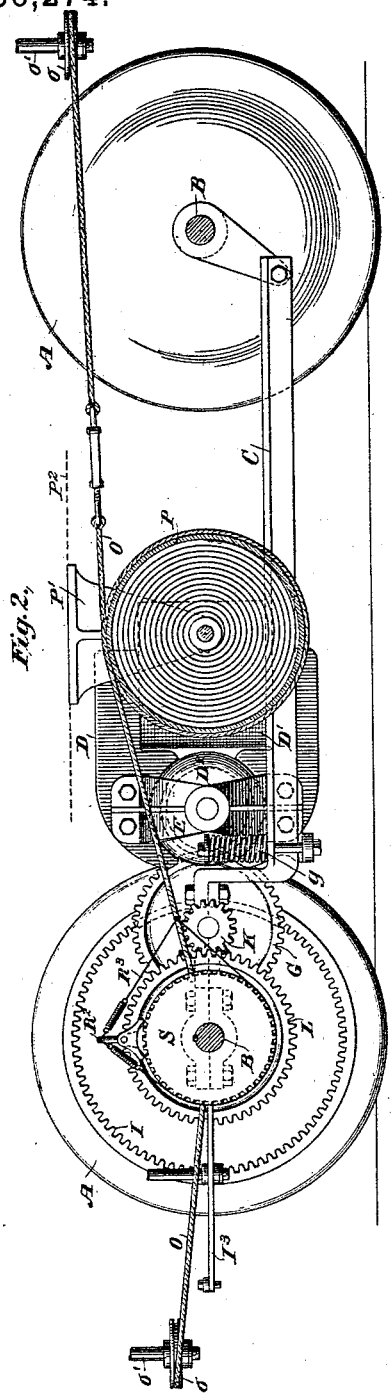
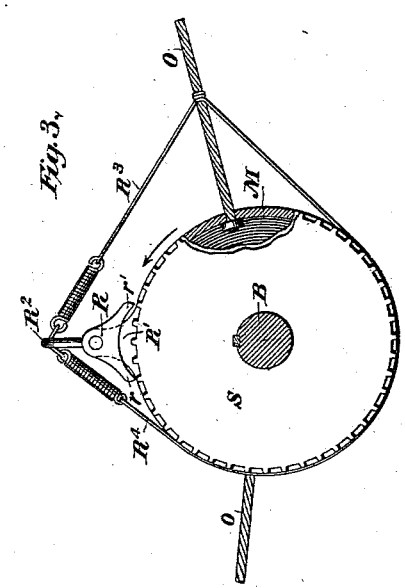
Witnesses
Geo. W. Breck.
Henry W. Lloyd.
Inventor
Robert J. Sheehy
By his Attorneys
Baldwin, Davidson & Wight

UNITED STATES PATENT OFFICE.

ROBERT J. SHEEHY, OF NEW YORK, N. Y.

MOTOR APPARATUS FOR VEHICLES.

SPECIFICATION forming part of Letters Patent No. 458,274, dated August 25, 1891.

Application filed November 24, 1890. Serial No. 372,496. (No model.)

*To all whom it may concern:*

Be it known that I, ROBERT J. SHEEHY, a citizen of the United States, residing at New York, in the county and State of New York, have invented certain new and useful Improvements in Motor Apparatus for Driving Vehicles, of which the following is a specification.

My invention contemplates more especially the use of electric motors, and its object is to reduce to a minimum the electrical horse-power required to propel a vehicle under any given conditions as to load or grade. To operate a vehicle along a level or grade where stops are to be made the horse-power of the motor must be equal to starting the vehicle from a dead-stop with any load that it would likely be required to carry. A motor that might be sufficient to move a car along a level or upgrade may not be sufficient to start the car from a dead-stop on such a level or grade. In ordinary systems of traction, such as street-car systems, therefore, the horse-power capacity of the motor must be calculated to start the car with its greatest probable load on the steepest grade of the track.

My invention consists in an organization whereby a less horse-power may be successfully used under the required conditions named.

In carrying out my invention I apply the power of the motor, when the vehicle is at rest, to mechanically store up energy by means of some suitable devices or apparatus the accumulated power from which is subsequently exerted to assist the motor in starting the vehicle. Various means of thus storing or accumulating mechanical energy are known in the arts, and familiar illustrations may be found in the compression of air, the formation of a vacuum, and the compression, torsion, or winding of springs, &c. The invention may obviously, therefore, be carried out in a variety of ways that will present themselves to the mind of the skilled engineer. I have illustrated and shall describe as one suitable embodiment of my invention an arrangement of spring or springs which are wound for the storage of power by the electric motor when the vehicle is at rest and which in reacting assist the motor in starting the vehicle. The organization shown is such that the motor may be run in either direction to propel the vehicle forward or backward, and in either event the energy stored in the springs is exerted to assist the starting of the vehicle in the required direction.

In the accompanying drawings, which show only so much of a suitable organization as is necessary to illustrate my invention, Figure 1 is a plan view of the running-gear or truck of a car equipped with my improved apparatus; Fig. 2, a vertical section of the same on the line 2 2 of Fig. 1, looking in the direction of the arrow; Fig. 3, a detail view showing an arrangement by which the power of the spring or springs is applied to drive the car in either direction.

A A are the wheels; B B, the axles, and C a frame hung upon the axles, as shown, or in any suitable manner. An electric motor D, of which D' is the field-coil, is supported upon the frame C. Preferably, and as shown, the motor may be swung from or cushioned on the frame at the front by coiled springs $g$, and similar springs may be placed at $d'$ in the rear. The bearings E for the armature $D^2$ are bolted to the field-poles on either side. The commutator and circuit connections may be of any ordinary character. The drawings merely show a motor in somewhat conventional form, and any suitable character of motor may be used. A pinion F on one end of the armature-shaft drives a gear-wheel G on a counter-shaft G'. Each end of this counter-shaft carries a pinion. The pinion H at one end meshes with an internal gear I, loose on the axle B and carrying one section of a clutch I', the opposite section $I^2$ of which is mounted on the axle B by a spline-and-feather connection and is operated as hereinafter described. The pinion K on the opposite end of the counter-shaft drives the gear L, loose on the axle and carrying one section of a clutch L', the opposite section $L^2$ of which is mounted by a spline-and-feather connection on a sleeve projecting from a drum M, the sleeve and drum both loosely enveloping the axle B. Two cables of wire rope, chain, or other suitable material are connected with opposite sides of this drum, one of them passing over pulleys $o$, having their bearings upon shafts $o'$, depending from the car or vehicle body, which is not shown, and have their ends connected with two spring-drums P P, mounted in a bracket P', bolted on the under side of the car-body, which is indicated in Fig. 2 by the dotted line P². As is obvious from Fig. 1, the arrangement is such that both springs will be wound when the drum M is revolved in either direction.

The clutches I² L² are operated by levers I³ L³, pivoted upon the bearings depending from the car-body, and having their ends connected by a cross-rod Q, on which is a toothed rack q, with which gears a pinion Q' on a depending shaft operated by a hand-wheel Q². (Indicated by a dotted line.) When the rod Q is thrown in the direction indicated by the full arrow, the clutch I' I² is locked and the power of the motor is applied to drive the vehicle. When the rod Q is thrown in the opposite direction, (indicated by the dotted arrow,) the clutch I' I² is loosened and the clutch L' L² locked, and consequently the power of the motor is transferred to the drum M, loosely mounted on the axle, and the cables O are wound upon the drum, thus winding up the springs P and mechanically storing therein the energy from the motor. Of course any suitable form of clutch adapted to the purpose herein indicated may be adopted. I have merely illustrated a conventional form. The clutch L' L², however, may be so organized, with reference to the operating-levers L³ Q and gearing Q' and q, that when the springs are being wound and their resistance approximates the power of the motor the clutch will slip and prevent the overloading of the motor. One arrangement of devices which makes this possible and serves to apply the power of the springs to the propulsion or starting of the vehicle is described below. Of course any other apparatus for the purpose may be adopted. It will be perceived that with such an organization I may employ a continuously-running motor.

A triangular-shaped dog R is pivoted at its apex in a bracket R', mounted on the drum M. A projection R², forming part of the dog and extending out beyond its pivot, is connected on one side by a coiled spring and cord R³ with one of the cables O, and on the opposite side by a coiled spring and cord R⁴, which in Fig. 3 passes around the drum M, and is joined to the cable O at the same point as the cord R³.

S is a toothed wheel fast upon the axle B and the teeth of which travel in close proximity to the ends r r' of the dog R when it is in a central or neutral position. If the motor is running in such a direction as to revolve the drum M in the direction indicated by the arrow, the cord R⁴ will be slackened, while the cord R³ will be tightened. The end r' of the dog will therefore be thrown down upon the teeth of the wheel S, but will slip over them, as the spring forming part of the cord R³ will permit it to yield. When the springs have been wound and the clutch L' L² loosened, the reaction of the springs, acting through the cables O, will tend to revolve the drum M in the opposite direction and the end of the dog r' will therefore positively engage the teeth of the wheel S, and the power exerted by the springs will then be applied to the axle to produce its rotation in the proper direction. When, therefore, on throwing the power of the motor upon the axle by locking the clutch I' I², it is only required to supplement the force exerted by the springs and the car will start easily without shocks and jars and without straining the motor. When the drum is revolved in the opposite direction to wind the spring, the end r of the dog similarly engages the wheel S to produce rotation in the opposite direction. If desired, both axles B B may be coupled by a chain and sprocket T T'.

I claim as my invention—

1. The combination, substantially as set forth, with a vehicle, of a motor, means for applying its power to propel the vehicle, means for mechanically storing the energy or power of the motor when it is not applied to the propulsion of the vehicle, and means for applying such stored mechanical energy to assist the motor in starting the vehicle.

2. The combination, substantially as set forth, with a vehicle, of a continuously-running motor, means for applying its power to propel the vehicle, means for mechanically storing the energy or power of the motor when it is not applied to the propulsion of the vehicle, and means for applying such stored mechanical energy to assist the motor in starting the vehicle.

3. The combination, substantially as set forth, with a vehicle, of an electric motor, mechanism for applying the power of the motor to propel the vehicle, power-storage devices by which the mechanical energy of the motor may be stored when the motor is not driving the vehicle, and means for applying such stored power or mechanical energy to assist the motor in starting the vehicle.

4. The combination, substantially as set forth, of the truck or running-gear of a car, an electric motor, driving mechanism by which the power of the motor is applied to the axle of the car, power-storage devices, mechanism by which the power of the motor is mechanically stored therein when it is not applied to the propulsion of the car, and means for applying such stored energy to assist the motor in starting the car.

5. The combination of a vehicle, a motor adapted to be run in either direction, mechanism for applying the power of the motor to propel the vehicle either forward or backward, means for mechanically storing the energy or power of the motor, and means for applying such stored energy to assist the motor in starting the vehicle in either direction.

6. The combination of a vehicle, a motor, means for applying the power of the motor to propel the vehicle, means for transferring the power of the motor from the vehicle, and means for mechanically storing the energy or power of the motor, and means for applying such stored mechanical energy to assist the motor in starting the vehicle.

7. The combination of a vehicle, a motor mounted thereon, means normally disconnected from the wheels of the vehicle for mechanically storing the energy or power of the motor also carried by the vehicle, and means for applying such stored mechanical energy to move the vehicle.

8. The combination of a motor, mechanism for applying the power of the motor to perform work, means for mechanically storing the power or energy of the motor, means for applying such stored mechanical energy to assist the motor in performing the work to which it is applied, and means for disconnecting it therefrom.

9. The combination, substantially as set forth, of a vehicle, an electric motor carried thereby, clutch mechanism interposed between the motor and driving-wheels of the vehicle, a spring-actuated power-storing device, connections between the power-storing device and the wheels, and clutch mechanism interposed in said connections.

In testimony whereof I have hereunto subscribed my name.

ROBERT J. SHEEHY.

Witnesses:
FRANK S. OBER,
EDWARD C. DAVIDSON.